United States Patent [19]

Moskovich

[11] 4,249,798
[45] Feb. 10, 1981

[54] MINIATURE CAMERA WITH ZOOM LENS

[75] Inventor: Jacob Moskovich, Los Angeles, Calif.

[73] Assignee: Vivitar Corporation, Santa Monica, Calif.

[21] Appl. No.: 941,516

[22] Filed: Sep. 11, 1978

[51] Int. Cl.³ .............................................. G02B 15/18
[52] U.S. Cl. ................... 350/423; 350/445; 350/450
[58] Field of Search ............... 350/184, 186, 176, 202, 350/209, 206

[56] References Cited
U.S. PATENT DOCUMENTS 3,658,411 4/1972 Price ..................................... 350/202
4,114,171 9/1978 Altman ................................ 354/152

OTHER PUBLICATIONS

*Camera Magazine*, No. 8, 8/1975 p. 47, C. J. Beecher, Ltd.
*Modern Photography*, "Keppler on the SLR," pp. 49, 52, 54–152, 8/1975.

*Primary Examiner*—Paul A. Sacher
*Attorney, Agent, or Firm*—DeLio and Montgomery

[57] ABSTRACT

Improvements in an optical system for a compact camera having an improved form of a zoom objective lens arranged substantially enclosed within the housing of the camera which is made compact by a twice folded optical path and a through-the-lens viewing system.

14 Claims, 21 Drawing Figures

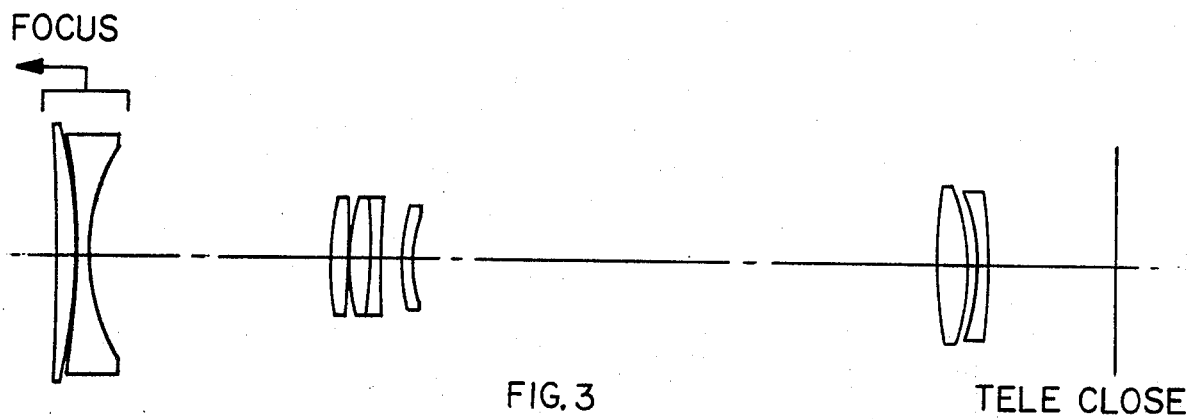
FIG. 3     TELE CLOSE
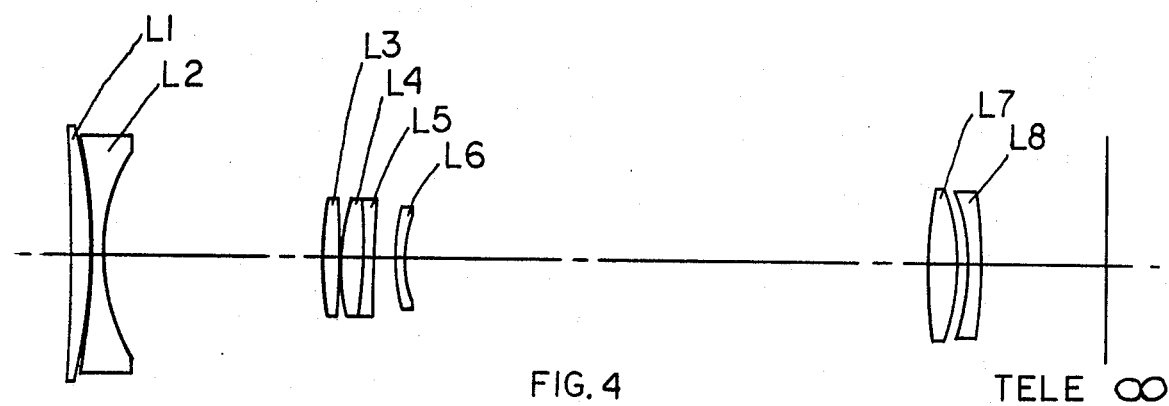
FIG. 4     TELE ∞
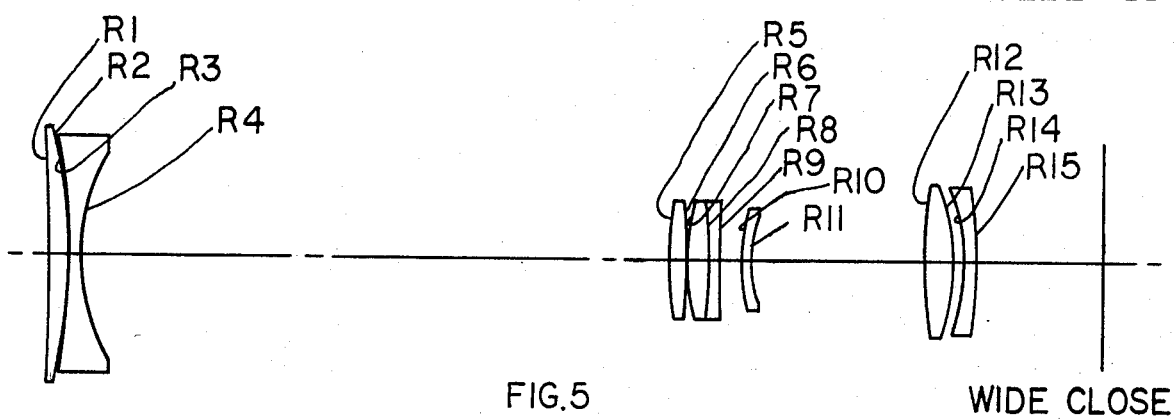
FIG. 5     WIDE CLOSE
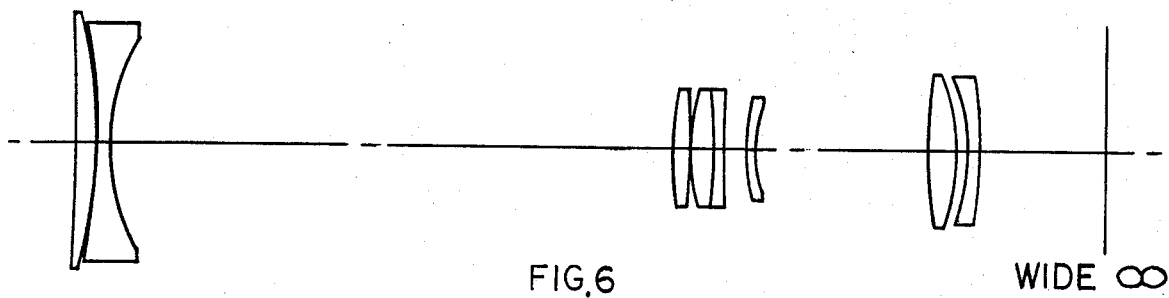
FIG. 6     WIDE ∞

FIG. 7
TANGENTIAL     1.00 RELATIVE FIELD HEIGHT (9.19)     SAGITTAL
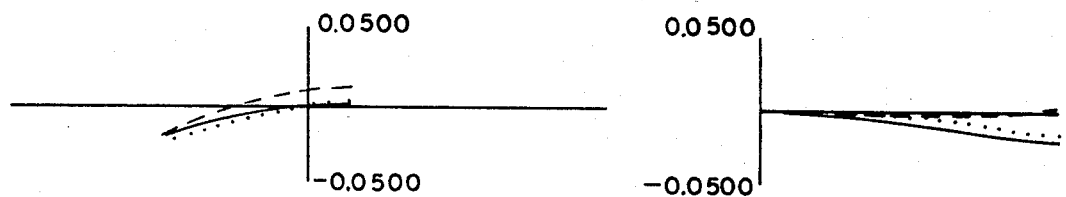
0.75 RELATIVE FIELD HEIGHT (8.92)
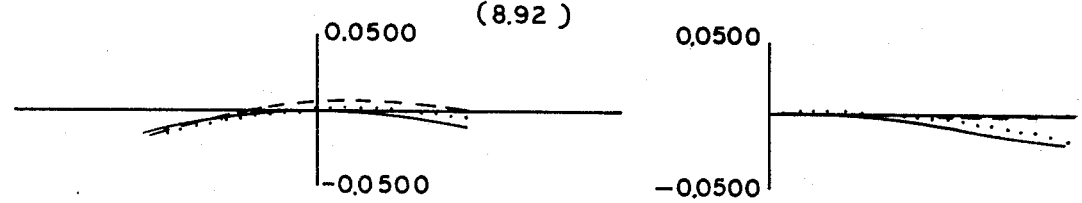
0.40 RELATIVE FIELD HEIGHT (3.70)
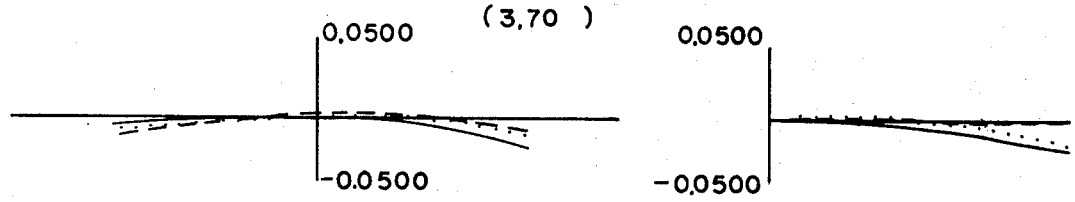
0.00 RELATIVE FIELD HEIGHT (0.00)
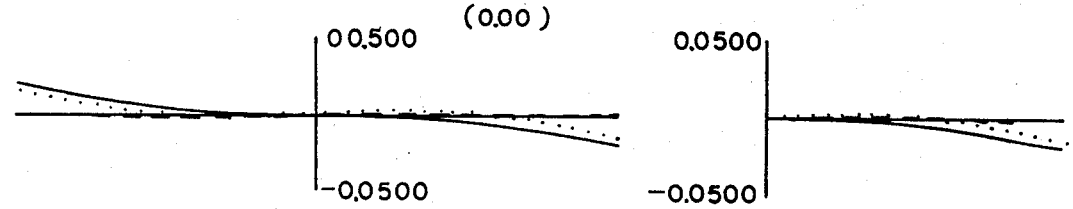

FIG. 8
TANGENTIAL  SAGITTAL
1.00 RELATIVE FIELD HEIGHT (8.88)
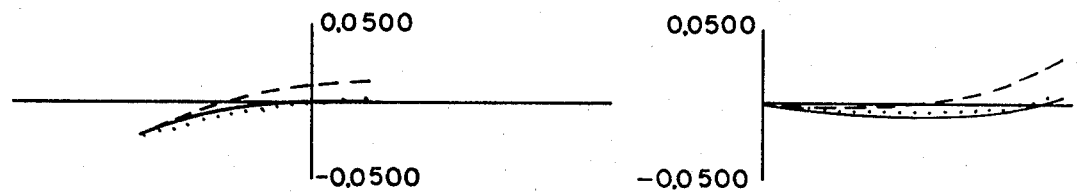
0.75 RELATIVE FIELD HEIGHT (8.88)
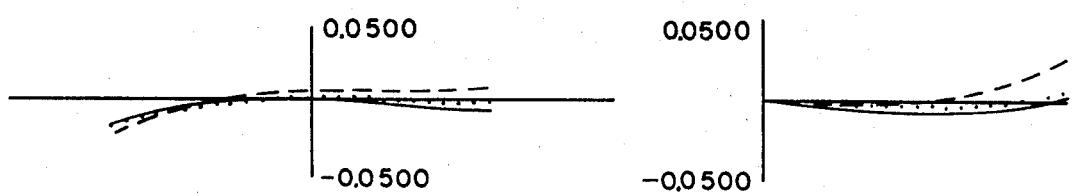
0.40 RELATIVE FIELD HEIGHT (3.58)
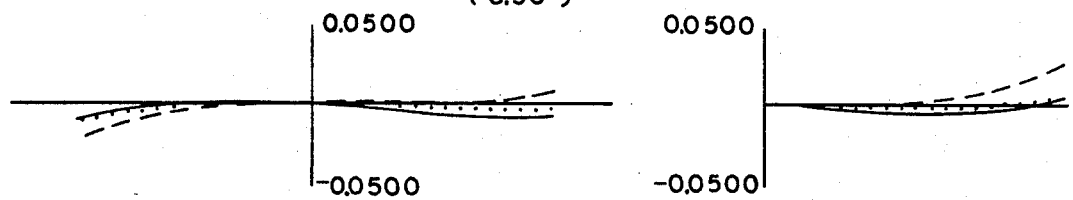
0.00 RELATIVE FIELD HEIGHT (0.00)
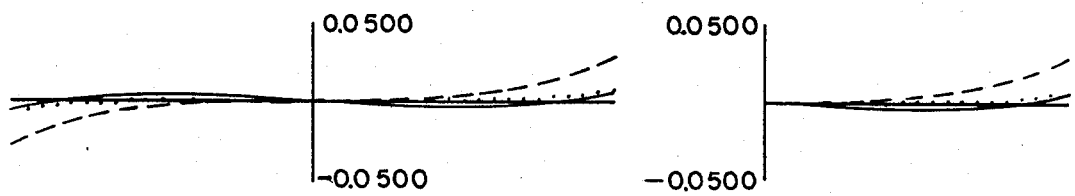

FIG. 9
TANGENTIAL — SAGITTAL
1.00 RELATIVE FIELD HEIGHT (23.98°)
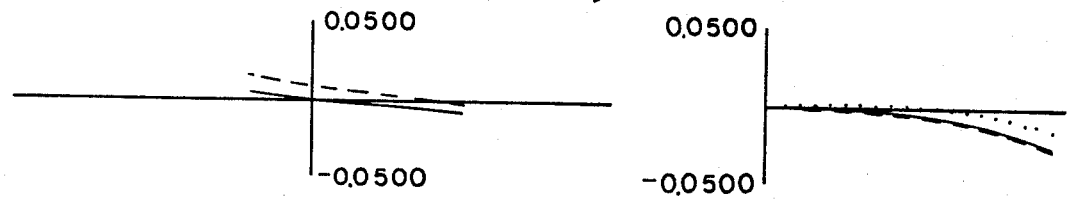
0.75 RELATIVE FIELD HEIGHT (18.44°)
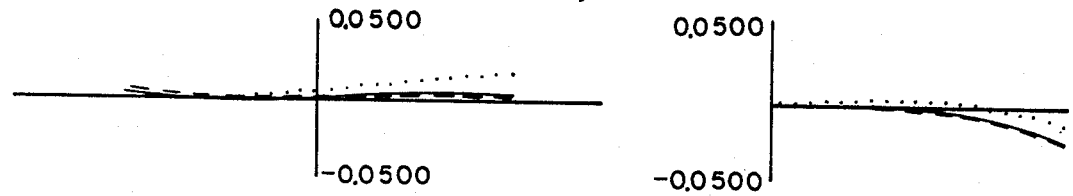
0.40 RELATIVE FIELD HEIGHT (10.09°)
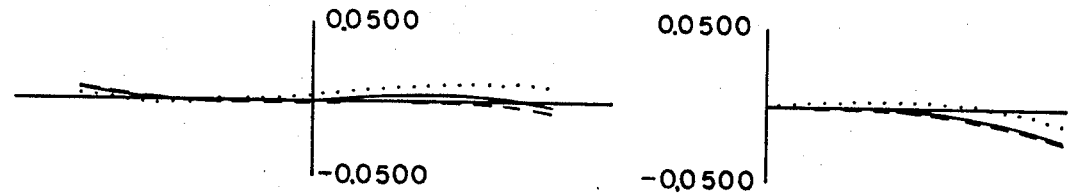
0.00 RELATIVE FIELD HEIGHT (0.00)
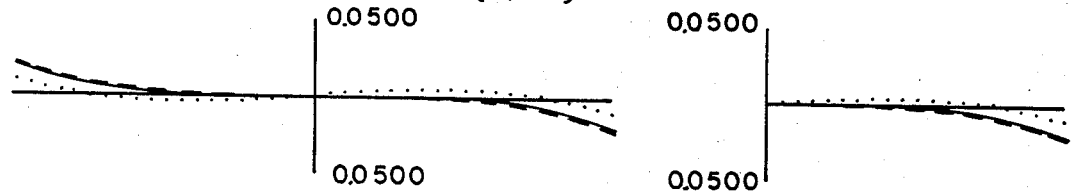

FIG. 10
TANGENTIAL — SAGITTAL
1.00 RELATIVE FIELD HEIGHT (23.50°)
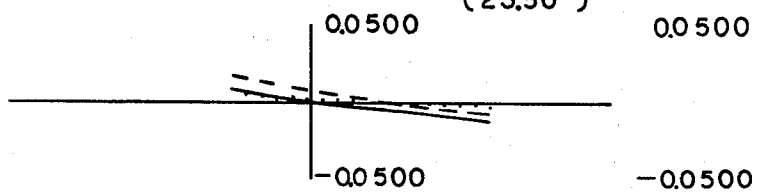
0.75 RELATIVE FIELD HEIGHT (18.08°)
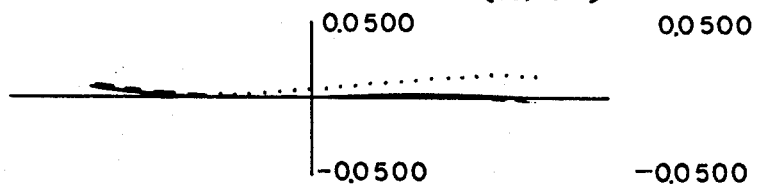
0.40 RELATIVE FIELD HEIGHT (9.87°)
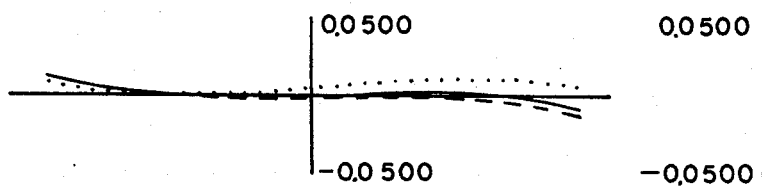
0.00 RELATIVE FIELD HEIGHT (0.00°)
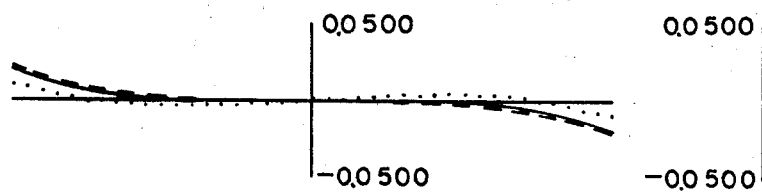

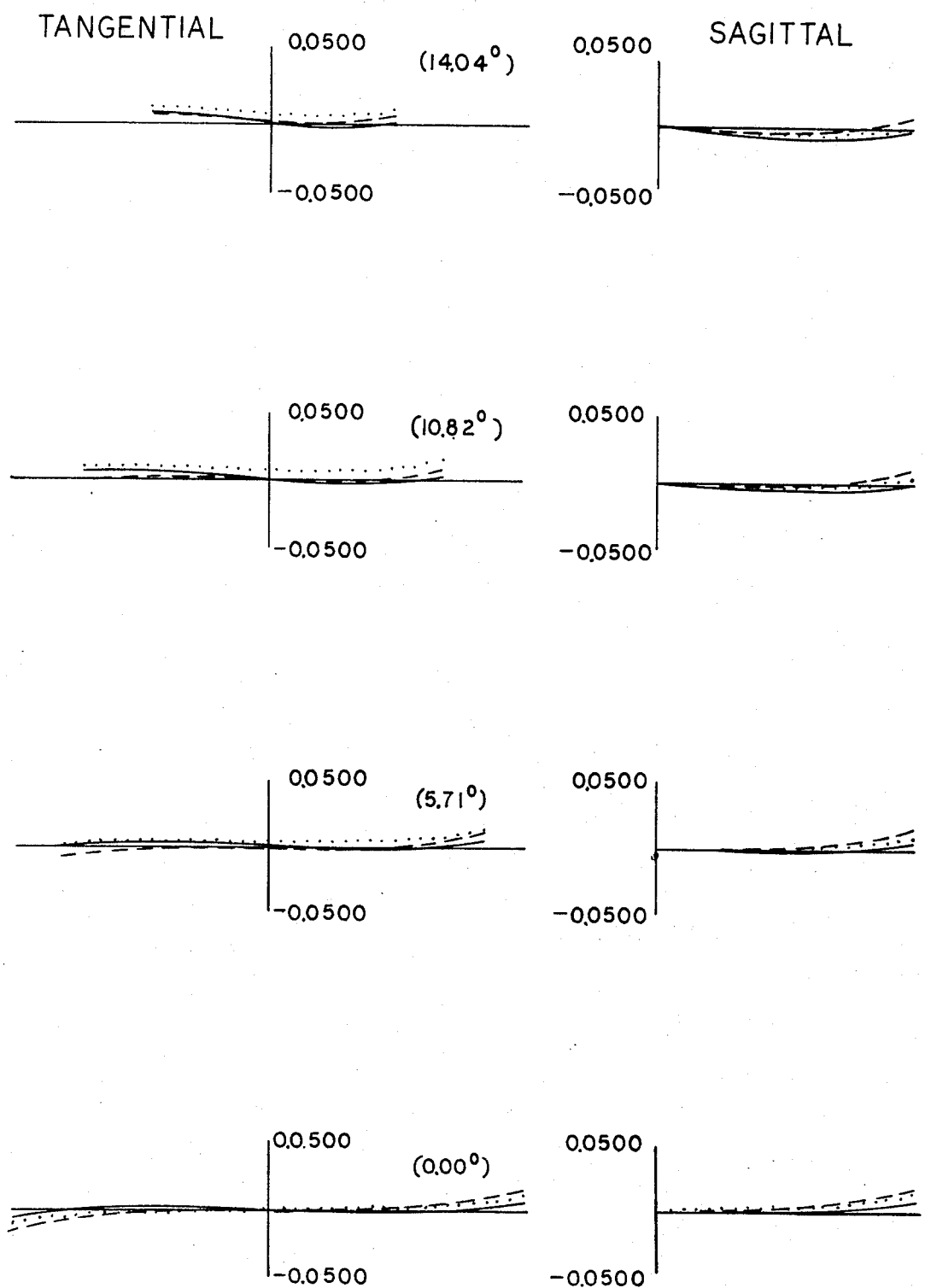

FOCUS

% DISTORTION

MINIATURE CAMERA WITH ZOOM LENS

This invention relates to improvements in an optical design for lenses usable in compact cameras, and more particularly relates to a zoom or variable focal length objective lens capable of being built into and contained substantially within the housing of such a compact camera.

Cameras of small dimensions, such as "pocket cameras", have recently become popular. For still photography, and as a preferred embodiment of this disclosure, such cameras may use a 110 film format cassette with predetermined dimensions which in part limit the minimum size of the camera. Also, such a compact camera may accept motion picture film. Generally, "pocket" cameras for still photography have been constructed with a Galilean type viewfinder system and a fixed focus, fixed focal length lens. Such a lens is short in overall length and usually has elements very small in diameter. However, cameras accepting film of the same format are available with interchangeable lenses, modifiable focal length lenses, and, recently, zoom or variable focal length lenses. Because of constraints of lens design, such small cameras with zoom lenses, particularly the still cameras, have been larger than desired when the size of the film cassette is considered. Also, because of the optical constraints, these cameras have not had certain features desirable to make the camera design competitive, such as relatively high speed, long zoom range lenses. Thus, the total camera configuration is usually more bulky than desired whereby the pocketability of the camera is limited.

To overcome the problem of size while gaining the benefits of zoom lenses, improvements in zoom lens design now enable mass production at reasonable cost of a compact "full" featured camera in the dimensions of a camera normally not having comparable features. In addition to the compactness of the camera, the desirability of the camera is aided by a through-the-lens viewing and focusing system, which helps the user to focus, compose, and take pictures.

A study of the designs of some lenses in existing cameras and lenses suggested in patents indicates problems associated with these lens forms when intended for incorporation in compact cameras. In certain cameras, the image on the film will be inverted as opposed to the conventional image orientation because the design introduces in the optical path a single mirror in the horizontal direction and a single mirror in the vertical direction. Therefore, during printing of a negative exposed in this type camera, the negative will have to be oriented with the emulsion side up, as opposed to the normal position of the emulsion side down for correct orientation of an image on the print. Although such an optical system provides a relatively compact camera design by folding the optical path of the lens so that the overall size of the camera is smaller than would be expected for a camera having a lens of the type used, the image reversal problems become of significance when it is recognized that most of the film exposed in pocket cameras is processed and printed "commercially". That is, the film is removed from a cartridge and placed in an automatic machine which processes the film and makes prints therefrom without an operator. The resulting error in image orientation becomes obvious primarily when written material appears in the print. Also, when slide film is used in the camera, and the resulting slides are intermixed with slides from other cameras, the projector must be re-focused as properly oriented slides from image-correct and image-reversed cameras are projected.

Manufacturing imperfections or variations exist in production of most reasonably priced, mass produced items. In items such as zoom lenses, variations in element position and dimensions may cause shifts in the position of the best image plane relative to the film plane as the effective focal length of the system is changed from one end of the zoom range to another. While maintaining cost effectiveness, variations in the best image plane must be minimized to the greatest extent possible to insure sharply imaged pictures within the capability of the camera. Generally, the smaller the variations permitted, the more difficult and expensive such a zoom lens is to manufacture. Therefore, it becomes almost necessary to use a through-the-lens viewing and focusing system in conjunction with a mass produced objective lens of a relatively wide zoom range and relatively fast aperture speed. Such a viewing system enables the user to focus the lens appropriately to compensate for possible focus shift errors while maintaining reasonable production costs for the lens and the camera.

The present invention relates to an improved, compact focusable objective lens of the mechanically compensated zoom type for use in a small film format camera. The lens, of relatively simple form has a twice folded optical path, and is designed with four functional groups including a front group of negative power. A movable diaphragm is incorporated in the camera to enable the lens with which it is used to be more compact. This lens design enables the camera housing to be more compact than would be expected for a comparable format housing accepting a lens of similar zoom range and effective aperture. Because of the small size of the lens, and the compactness of the folded optical path, the lens can be contained substantially within a camera housing, which is not significantly larger than a housing for certain cameras of the same format having a fixed focal length lens.

To assist in making the optical path of the objective lens compact, two image reflectors are arranged normal to each other to twice fold the optical path. The effect of twice folding the optical path is to correct the orientation of the image impinging on the film in the camera. From the optical path, the image is reflected to a through-the-lens viewing system, and because of the folding in the path and reflecting means in the viewing system is properly oriented for ease of viewing. That is, the scene to be viewed is imaged in the viewfinder by a fixed relay component of the objective optical system and other reflectors so that the resulting image is oriented properly and can be viewed through a Kelner type eyepiece. The viewfinder optics, the reflectors, and added mirrors are arranged and selected to retain the benefits of the otherwise compact configuration.

An object of this invention is to provide a new and improved variable focal length objective lens adaptable to be built into a compact camera housing.

Another object of this invention is to provide a new and improved optical system for a variable focal length objective lens usable in a camera having through-the-lens viewing and focusing.

Still another object of this invention is to provide an easily manufactured objective lens of simple configuration arranged with a twice folded optical path enabling the focal length to be varied, and the objective lens to be focused through a viewfinder of a compact camera.

Further and other objects will be apparent from the description and the accompanying drawings, in which like numerals refer to like parts.

In the drawings:

FIGS. 3-6 are diagrammatic sectional views of an optical system according to the present invention with elements thereof respectively in telephoto close focused condition, telephoto infinity focused condition, wide angle close focused condition, and wide angle infinity focused condition;

Figure 16A:
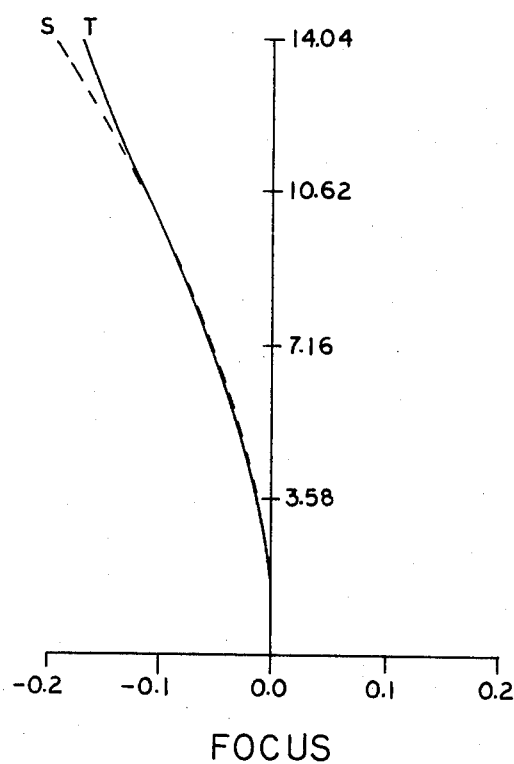
Figure 16B:
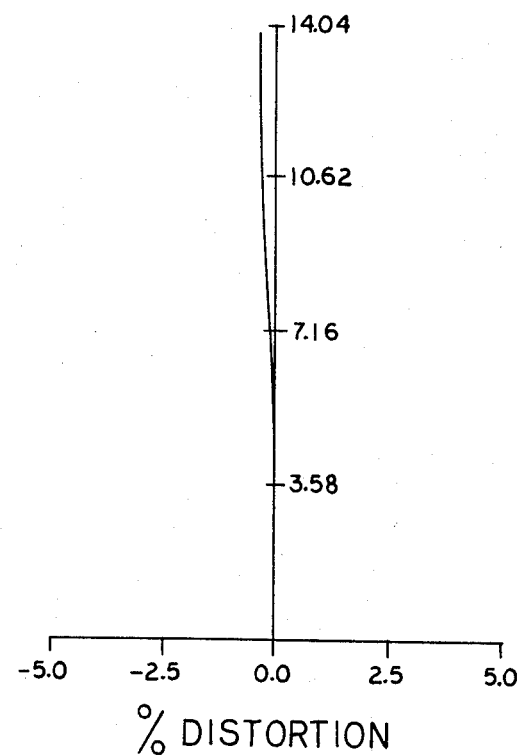

FIGS. 7, 8, 9, and 10 are graphical representations of various aberrations of the lens system of FIGS. 3-6 with the elements, respectively, in telephoto infinity focused condition, telephoto close focused condition, wide angle infinity focused condition and wide angle close focused condition;

FIGS. 11A and 11B, 12A and 12B, 13A and 13B, and 14A and 14B are graphical representations of the astigmatic field curves and of distortion for the optical system respectively at the conditions of FIGS. 7-10;

FIG. 15 is a graphical representation of various aberrations of the lens system in an intermediate focal length, infinity focused condition; and FIGS. 16A and 16B are graphical representations of the astigmatic field curves and of distortion of the optical system in the intermediate focal length, infinity focused condition.

Figure 1:
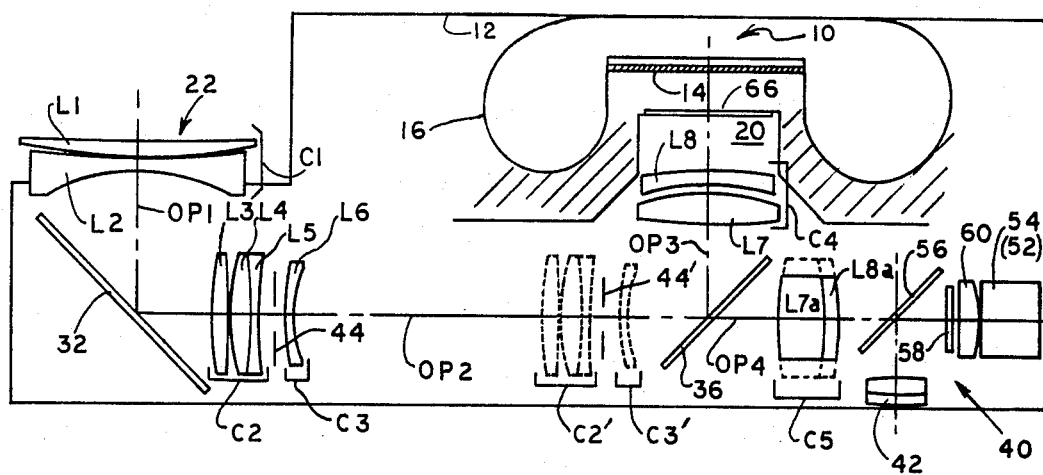
FIG. 1 is a top plan view of a camera incorporating a zoom lens and a viewfinder system according to the present invention, with parts broken away and parts omitted for clarity.

Referring to FIG. 1, a preferred embodiment of a camera 10 embodying the invention is shown with a generally rectangularly shaped housing 12 adapted to accept film 14 contained in a cassette 16, which is shown in FIG. 1 as being loaded into the camera housing through a door (not shown). By the operation of the door and other components of the housing, the film is positioned in the film plane of the camera behind an exposure aperture 20 so that an image formed by an objective lens 22 may impinge thereon. By other mechanisms of the camera including a film advance mechanism (not shown), the film 14 is incrementally advanced frame-by-frame across the exposure aperture from a supply side of the cartridge to a take-up side of the cartridge.

Light rays from a scene to be photographed are admitted to the camera through the objective lens 22 positioned with the forward element L1 of the first component group C1 externally exposed. This component group is stationary when the focal length of the lens is changed, yet is movable axially of that portion of the optical path (OP1), formed by element L1, when focusing on subjects at finite conjugate distances from the camera. Internally of the first component group C1 is arranged a reflector member, shown as a mirror 32, by which the light rays are reflected toward other component groups of the zoom lens. Following the reflector 32, are two zooming groups including a variator group C2 and a compensator group C3 which are movable along a path OP2 transversely to the first component group C1 and a fourth, fixed relay group C4, which is arranged on an optical path portion OP3 parallel to the optical path OP1 of the first component group. The zooming groups C2, C3 are movable relative one another and the first and fourth groups to change the effective focal length of the optical system whereby the angle of view of a scene to be photographed is altered. As the focal length of the lens is changed from between telephoto and wide angle conditions, the component groups C2 and C3 may be displaced along optical path OP2 from the position shown as C2, C3 to the positions shown as C2$^1$ and C3$^1$.

Clearly, the objective lens has an unusually long track length and unexpectedly wide spacing between components for accepting the reflector means therebetween.

The light rays exiting component C3 of the objective lens are directed toward another reflector member 36 from which they are reflected toward a fourth component C4 of the objective lens 22 to cause proper orientation of the image onto film positioned at the image plane 14. This fourth component is located between the reflecting surface 36 and the film plane 14 to relay the light rays thereto whereby the image of the scene may be recorded. Some of the light rays exiting component C3 are directed fully or partially to a fifth component C5 which relays these light rays to a viewfinder system 40 for enabling through-the-lens viewing through an eyepiece 42. Either following the front component C1 or before or after the relay component C5, light sensor means (not shown) may be arranged to receive a portion of the light rays to enable measurement of the quantity of light reflected from the scene, and substantially corresponding to the light reaching the film plane.

For compactness, the objective lens 22 has a twice folded optical path which is bent by the reflector members 32, 36 which might be fully and/or partially reflecting mirrors and/or right angle prisms. Although the optical axis can be deflected by the mirrors at any angle, a principle condition to be maintained is that the planes of the two reflectors must be normal relative to one another. This two 90° reflections will cause correct orientation of the image on the film plane arranged forwardly of the camera housing; As shown in FIG. 1, the housing of the camera 10 is configured with the objective lens 22 forwardly directed and the viewfinder eyepiece 42 accessible from the rear of the camera. One mirror or prism 32 is located to reflect the light rays an optical path portion OP2 along the long dimension of the camera housing 12, and toward the second mirror 36, which is located behind the compensator group C3 and in front of the relay groups C4 and C5. The second reflector member 36 may be either a mirror or prism that can be moved into and out of the optical path OP2 or alternatively a stationary beam splitter or semi-reflecting member. In either configuration, light rays are reflected to the film plane 14 during film exposure and are passed to the viewfinder system 40 at least during all time periods other than during film exposure. Both configurations have advantages and disadvantages which may be considered in selecting the latter light ray reflecting member 36 to be used.

While the beam splitter or a semi-reflecting pellicle mirror 36 may mean higher light losses in either or both the taking lens path and the viewfinder path, the possibility of vibrations which a moving mirror might create is eliminated. The light loss with a semi-reflecting mirror occurs when some light passes through the mirror while other is reflected along the other path at all times. However, none of the components move to introduce vibrations. Alternatively, the moving mirror approach provides a higher quantity of the available light to the respective optical paths. However, the moving mirror may present problems as the mirror moves into a position to intercept the viewing optical axis and direct light to the film when the user makes an exposure. That is, if the mirror is swinging into or out of that position, vibrations of the mirror, when stopping its motion, can cause image blur. To overcome this drawback, a delay may be introduced between the moment the mirror stops and the moment the shutter opens to make an exposure. An alternative is to "slide in" the mirror. In this manner, the delay is not required because vibrations will not cause the lateral shift of the image.

Compactness of the zoom lens, aided by the twice-folded optical axis, is aided further by the motion the aperture stop or diaphragm iris 44 which is arranged between movable component groups C2 and C3. As the position of the component groups and the iris is altered, the position of the image of the aperture stop or iris is altered responsive to changes in relative positions and spacing of the groups and the iris with respect to the relatively fixed front and rear groups. Moving the aperture stop helps to improve the performance of the lens by achieving a better balance of aberrations. The aperture stop may be cammed so that as it moves together with one of the zooming groups, a constant effective aperture for the lens is maintained. Further, the movable aperture stop helps to reduce the size of the front element L1.

In this lens design, the front group C1 is selected to be of negative power while the variator group C2 is of positive power. Also, the compensator groups C3 is of negative power and both of the rear, fixed relay groups C4, C5 are of positive power, although the effective focal lengths of these rear groups may differ. The negative, positive arrangement of the front and variator groups provides sufficient space therebetween for the mirror 32 to be included therein while the diameter of the front element is maintained as small as possible. To have the spaces between component groups C1 and C2, and component groups C3 and C4 large enough to accept the mirrors of required size without image cutoff, the powers of the individual lens group should lie in the region outlined by the set of inequalities set forth below. That is, a lens satisfying these inequalities will provide a compact zoom lens with an increased optical axis length, and limited diameter so the lens can be substantially enclosed within a physically small camera housing.

$$0.3 \leq |F_A/FVD| \leq 0.5$$
$$0.1 \leq F_B/FVD \leq 0.2$$
$$0.1 \leq |F_C/FVD| \leq 0.4$$
$$0.3 \leq F_D/FVD \leq 0.5$$
$$F_A < 0$$
$$F_D/BFL \geq 2.4$$

where $F_A$, $F_B$, $F_C$, and $F_D$ are effective focal lengths of the groups C1, C2, C3, and C4, respectively; FVD is a front vertex to image distance, and BFL is the back focal length or image distance between the last element and the film plane.

Referring now in more detail to the objective lens 22, the four groups of the lens are arranged along the continuous optical axis having an entrance axis portion OP1, an intermediate portion OP2, and an exit portion OP3, to the film plane. The first focusing objective group C1 is axially movable for focusing on a remote subject, and defines the optical axis portion OP1, which is folded to axis portion OP2 by the reflecting means 32. This first component group of the lens, starting at the ray entrance side of the optical system, includes a positive meniscus element L1 and a biconcave negative meniscus element 12.

Positioned first on the intermediate or lateral portion OP2 of the optical axis is component group C2, a three element variator which is arranged for axial movement as required to vary the focal length of the lens. The first element L3 of the group is a positive power singlet. The next elements L4 and L5 are a positive doublet slightly concave rearwardly, and spaced from group C3. This component group may comprise more or less elements as a matter of optical design.

Component group C3 is the compensator component, and in this embodiment comprises a single element L6 which is predominantly convex forwardly. Between the groups C2 and C3, is arranged the aperture stop 44 which can move with the group C3 as the focal length of the optical system is varied.

Following element L6, the optical path is divided by the reflector 36 to provide light to the viewfinder 40 and to the film plane 14. For imaging the light rays at the film plane, the fourth component or fixed relay group C4 is positioned on optical axis portion OP3. This group includes a front bi-convex singlet L7 and a negative meniscus element L8. In an alternate optical axis portion OP4, a secondary fixed relay component group C5 consists of a doublet L7a and L8a designed to focus an intermediate image on a focusing screen 58 of the viewfinder system. This group may be of the same optical configuration as component C4. The screen 58 is displaced beyond the relay group C5 by a distance adequate to permit insertion in the optical system of other optical components. The image, relayed through these other optical elements, can be observed through the viewfinder element 42.

Figure 2:
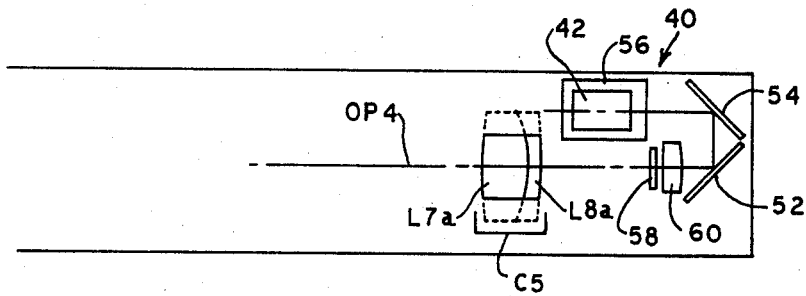
FIG. 2 is a view in elevation of a portion of the viewfinder system of the camera of FIG. 1 with certain parts removed and other displaced to show the arrangement of optical elements thereof.
Figure 11A:
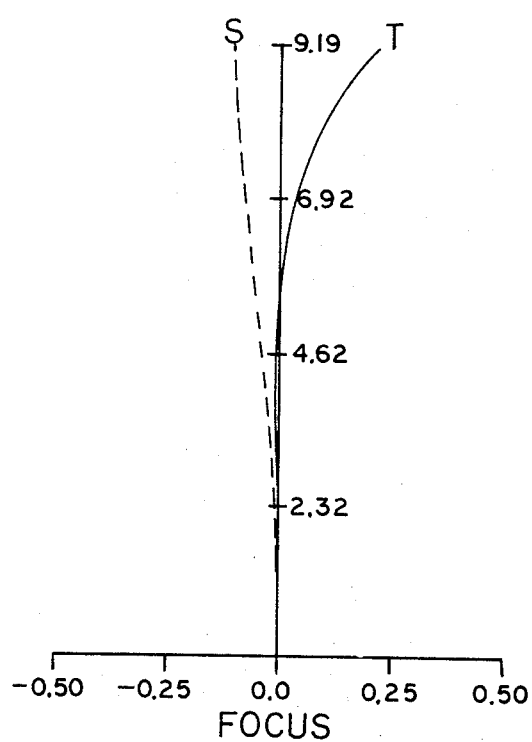
Figure 11B:
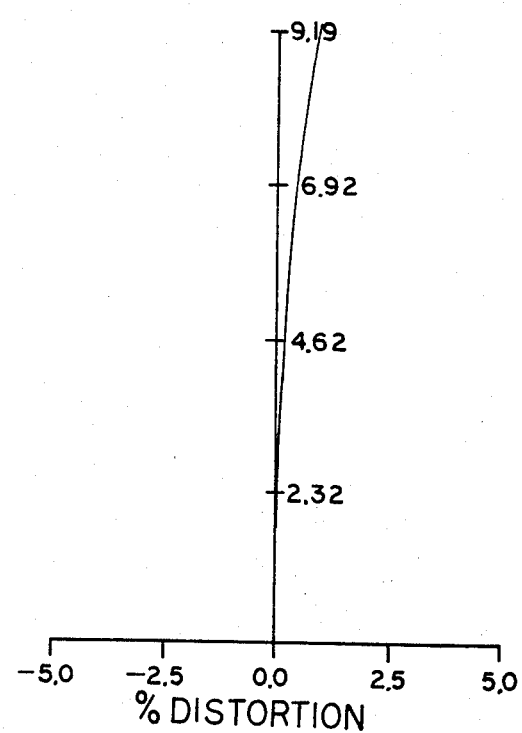
Figure 12A:
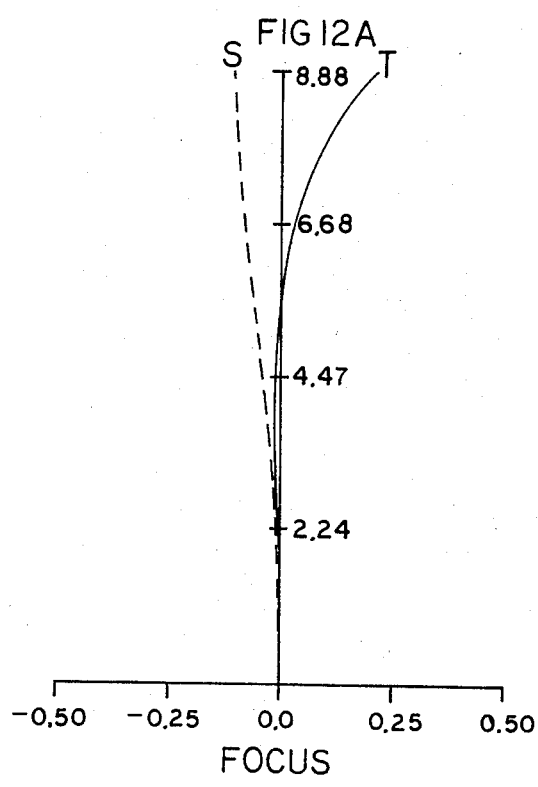
Figure 12B:
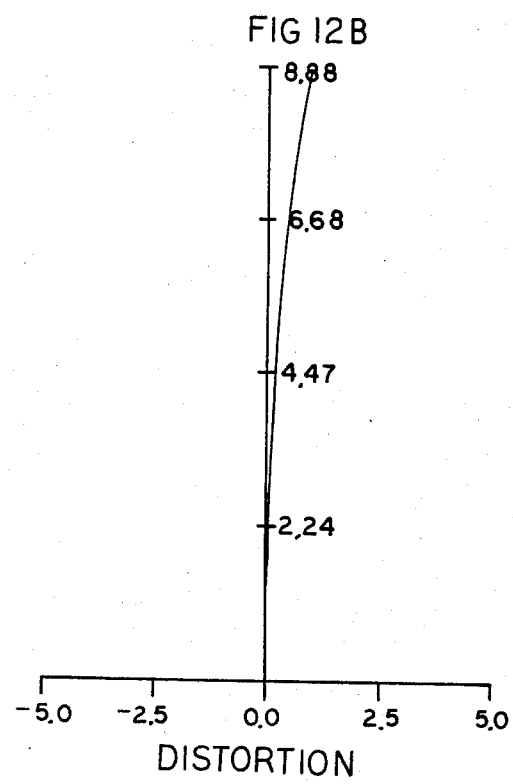
Figure 13A:
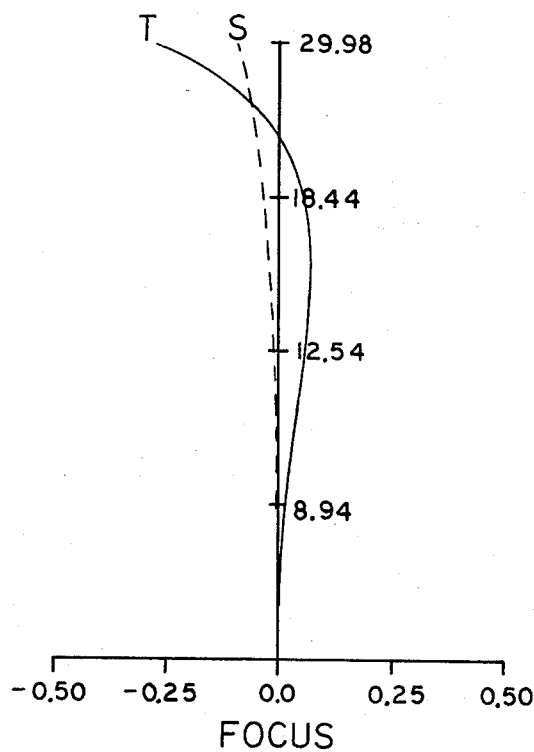
Figure 13B:
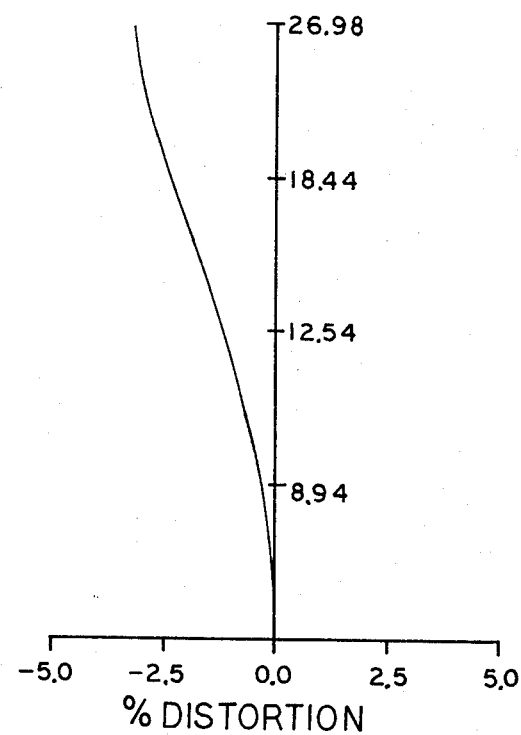
Figure 14A:
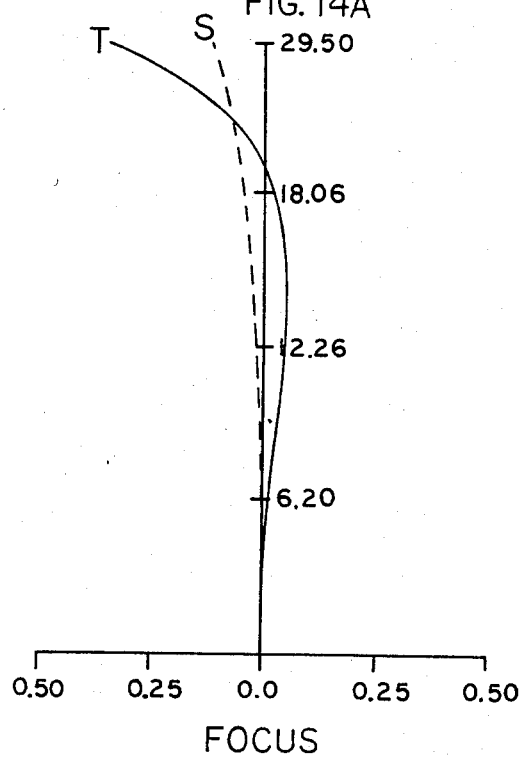
Figure 14B:
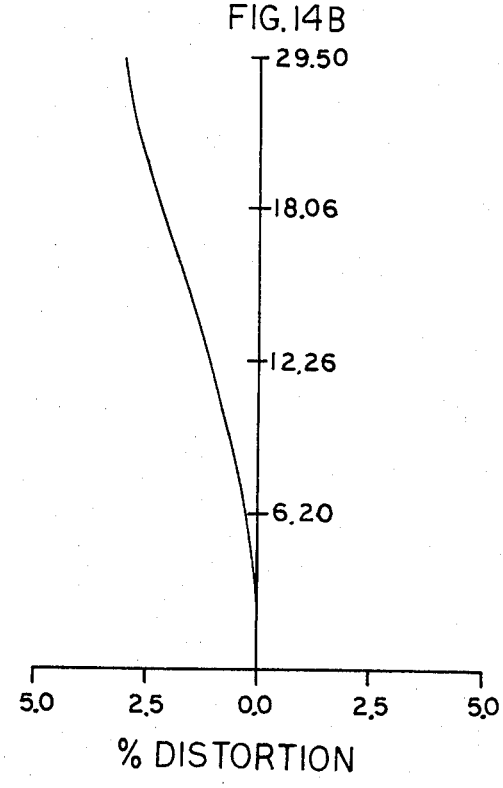

Referring to FIG. 2, the viewfinder system 40 contains three mirrors 52, 54, 56 which orient the image to be viewed to agree with real life orientation. The image is formed on a screen 58 and is, in turn, viewed through the viewfinder portion of the optical system, a field lens 60 and the eyepiece 42. As light exits the relay lens C5, the light rays impinge upon the first small mirror 52, and in the orientation of the camera as shown, are deflected upwardly toward the second small mirror 54. The latter mirror 54 reflects the light rays toward yet another mirror 56, which in turn reflects the light rays toward the eyepiece doublet 42. By thrice folding the light path between the field lens 60 and the eyepiece 42, the dimensions of the body are maintained small enough to be considered compact, while the image is correctly oriented for viewing through the eyepiece arranged to the rear of the camera housing 12.

A shutter means 66 is arranged across the optical path portion OP3 behind the second reflector 36 to control the transmission of light to the film plane. The shutter 66, which may be positioned either before or after component C4, is operated in response to actuation of a camera control button (not shown).

A preferred embodiment of the lens system is constructed according to the table following wherein specifications are set forth and refractive index and the Abbe or dispersive index of the optical materials are respectively designated at N and V.

TABLE I

Dimensions Are Given in Ratios of Unity Focal Length

TABLE I-continued

| EFL | BFL | F/N | FVD |
|---|---|---|---|
| 1.0-2.78 | 0.91 | 5.6 | 7.33 |

Iris is located at 0.03 in front of surface 10.

| Surface No. | Radius | Thickness | $N_D$ | V |
|---|---|---|---|---|
| 1 | −41.35 | 0.12 | 1.785 | 25.7 |
| 2 | −4.17 | 0.01 | | |
| 3 | −5.88 | 0.09 | 1.658 | 57.3 |
| 4 | 1.47 | (1) | | |
| 5 | 2.09 | 0.11 | 1.697 | 55.5 |
| 6 | Plano | 0.01 | | |
| 7 | 1.24 | 0.16 | 1.697 | 55.5 |
| 8 | −4.08 | 0.05 | 1.785 | 25.7 |
| 9 | 4.08 | (2) | | |
| 10 | 1.56 | 0.05 | 1.518 | 59.0 |
| 11 | 0.71 | (3) | | |
| 12 | 3.32 | 0.22 | 1.697 | 55.5 |
| 13 | −1.64 | 0.06 | | |
| 14 | −1.43 | 0.09 | 1.785 | 25.7 |
| 15 | −3.65 | | | |

| EFL | ZOOM SPACE (1) | ZOOM SPACE (2) | ZOOM SPACE (3) |
|---|---|---|---|
| 1.0 | 4.01 | 0.19 | 1.25 |
| 1.74 | 2.62 | 0.09 | 2.74 |
| 2.78 | 1.54 | 0.19 | 3.72 |

$|F_A/FVD| = 0.35$   $F_A = -2.57$
$F_B/FVD = 0.20$   $F_B = 1.43$
$|F_C/FVD| = 0.35$   $F_C = 2.58$
$F_D/FVD = 0.44$   $F_D = 3.25$
$F_D/BFL = 3.57$

In the above table, and the tables hereinafter, the first column lists the surfaces of the lens elements numerically starting at the ray entrance side of the system. The second column lists the radii for the respective surfaces of the elements with the positive values of the radii indicating surfaces which are convex to the ray entrance and the negative values (−) of the radii indicating surfaces which are concave. The third column lists the thickness of the elements and the spacing therebetween. The fourth and fifth columns list respectively the refractive index N and the dispersive index V of the elements.

FIGS. 7, 8, 9, 10, and 15 graphically represent various transverse ray aberrations of the optical system shown in FIGS. 3-6 and having the design data set forth in Table I above. The conditions represented are, respectively, telephoto infinity focused, telephoto close focused, wide angle infinity focused, wide angle close focused, and intermediate infinity focused. The dashed line curve represents the axial ray bundle for 480.0 nm wave length; The solid line is for 546.1 nm wave length; and the dotted line is for 643.8 nm wave length.

FIG. 11A, 12A, 13A, 14A, and 16A represent astigmatic field curves for transverse tangential (T) and sagittal (S) field curvature, respectively as shown in solid and dotted lines. FIGS. 11B, 12B, 13B, 14B, and 16B represent the distortion plotted as a percentage deviation from a "perfect" image.

An alternate embodiment of an optical system incorporating the present invention is exemplified in the following table:

TABLE II

Dimensions Are Given in Ratios of Unity Focal Length

| EFL | BFL | F/N | FVD |
|---|---|---|---|
| 1.0-2.0 | 0.61 | 4.0 | 4.64 |

Iris is located at 0.02 in front of surface 9.

| Surface No. | Radius | Thickness | $N_D$ | V |
|---|---|---|---|---|
| 1 | 3.93 | 0.10 | 1.673 | 32.2 |
| 2 | −4.69 | 0.004 | | |
| 3 | −7.19 | 0.07 | 1.620 | 60.3 |
| 4 | 0.89 | (1) | | |
| 5 | 0.92 | 0.16 | 1.639 | 55.5 |
| 6 | −19.68 | 0.08 | | |
| 7 | 1.22 | 0.13 | 1.630 | 58.3 |
| 8 | −19.14 | (2) | | |
| 9 | −1.62 | 0.04 | 1.673 | 32.2 |
| 10 | 0.39 | 0.01 | | |
| 11 | 0.43 | 0.08 | 1.658 | 57.3 |
| 12 | 1.18 | (3) | | |
| 13 | 23.63 | 0.04 | 1.689 | 31.2 |
| 14 | −6.81 | 0.004 | | |
| 15 | 0.92 | 0.09 | 1.713 | 53.9 |
| 16 | 3.03 | | | |

| EFL | ZOOM SPACE (1) | ZOOM SPACE (2) | ZOOM SPACE (3) |
|---|---|---|---|
| 1.0 | 2.12 | 0.19 | 0.91 |
| 1.5 | 1.45 | 0.20 | 1.57 |
| 2.0 | 0.99 | 0.23 | 2.01 |

$|F_A/FVD| = 0.47$   $F_A = -2.20$
$F_B/FVD = 0.18$   $F_B = 0.83$
$|F_C/FVD| = 0.18$   $F_C = 0.85$
$F_D/FVD = 0.31$   $F_D = 1.46$
$F_D/BFL = 2.39$

Other embodiments of the optical system are set forth below:

TABLE III

Dimensions Are Given in Ratios of Unity Focal Length

| EFL | BFL | F/N | FVD |
|---|---|---|---|
| 1.0-2.78 | 0.91 | 5.6 | 7.33 |

Iris is located at 0.03 in front of surface 10.

| Surface No. | Radius | Thickness | $N_D$ | V |
|---|---|---|---|---|
| 1 | −39.54 | 0.12 | 1.785 | 25.7 |
| 2 | −4.15 | 0.01 | | |
| 3 | −5.79 | 0.09 | 1.658 | 57.3 |
| 4 | 1.48 | (1) | | |
| 5 | 2.12 | 0.11 | 1.697 | 55.5 |
| 6 | −146.90 | 0.01 | | |
| 7 | 1.24 | 0.16 | 1.697 | 55.5 |
| 8 | −4.00 | 0.05 | 1.785 | 25.7 |
| 9 | 4.20 | (2) | | |
| 10 | 1.59 | 0.05 | 1.518 | 59.0 |
| 11 | 0.72 | (3) | | |
| 12 | 3.44 | 0.22 | 1.697 | 55.5 |
| 13 | −1.62 | 0.06 | | |
| 14 | −1.40 | 0.09 | 1.785 | 25.7 |
| 15 | −3.45 | | | |

| EFL | ZOOM SPACE (1) | ZOOM SPACE (2) | ZOOM SPACE (3) |
|---|---|---|---|
| 1.0 | 4.02 | 0.19 | 1.25 |
| 1.74 | 2.63 | 0.09 | 2.74 |
| 2.78 | 1.54 | 0.19 | 3.72 |

$|F_A/FVD| = 0.35$   $F_A = -2.57$
$F_B/FVD = 0.20$   $F_B = 1.43$
$|F_C/FVD| = 0.35$   $F_C = 2.58$
$F_D/FVD = 0.44$   $F_D = 3.25$
$F_D/BFL = 3.57$

TABLE IV

Dimensions Are Given in Ratios of Unity Focal Length

| EFL | BFL | F/N | FVD |
|---|---|---|---|
| 1.0-2.78 | 0.91 | 5.6 | 7.13 |

Iris is located at 0.04 in front of surface 10.

| Surface No. | Radius | Thickness | $N_D$ | V |
|---|---|---|---|---|
| 1 | −41.01 | 0.12 | 1.785 | 25.7 |
| 2 | −3.98 | 0.01 | | |
| 3 | −5.40 | 0.09 | 1.654 | 57.5 |
| 4 | 1.43 | (1) | | |
| 5 | 2.24 | 0.11 | 1.697 | 55.5 |

TABLE IV-continued

| Surface | Radius | Thickness | $N_D$ | V |
|---|---|---|---|---|
| 6 | −16.57 | 0.01 | | |
| 7 | 1.08 | 0.16 | 1.697 | 55.5 |
| 8 | −3.67 | 0.05 | 1.785 | 25.7 |
| 9 | 3.98 | (2) | | |
| 10 | 2.03 | 0.05 | 1.511 | 57.8 |
| 11 | 0.67 | (3) | | |
| 12 | 3.67 | 0.22 | 1.697 | 55.5 |
| 13 | −1.59 | 0.06 | | |
| 14 | −1.38 | 0.09 | 1.785 | 25.7 |
| 15 | −3.11 | | | |

| EFL | ZOOM SPACE (1) | ZOOM SPACE (2) | ZOOM SPACE (3) |
|---|---|---|---|
| 1.0 | 3.87 | 0.15 | 1.25 |
| 1.74 | 2.53 | 0.09 | 2.65 |
| 2.78 | 1.48 | 0.17 | 3.62 |

$|F_A/FVD| = 0.35 \quad F_A = -2.50$
$F_B/FVD = 0.18 \quad F_B = 1.26$
$|F_C/FVD| = 0.28 \quad F_C = -1.97$
$F_D/FVD = 0.44 \quad F_D = 3.14$
$F_D/BFL = 3.45$

TABLE V

Dimensions Are Given in Ratios of Unity Focal Length

| EFL | BFL | F/N | FVD |
|---|---|---|---|
| 1.0−2.78 | 0.91 | 5.6 | 6.71 |

Iris is located at 0.04 in front of surface 10.

| Surface No. | Radius | Thickness | $N_D$ | V |
|---|---|---|---|---|
| 1 | 38.20 | 0.12 | 1.785 | 25.7 |
| 2 | −3.95 | 0.01 | | |
| 3 | −5.32 | 0.09 | 1.673 | 56.5 |
| 4 | 1.23 | (1) | | |
| 5 | 1.80 | 0.11 | 1.697 | 55.5 |
| 6 | −8.20 | 0.01 | | |
| 7 | 1.02 | 0.16 | 1.697 | 55.5 |
| 8 | −2.65 | 0.05 | 1.785 | 25.7 |
| 9 | 11.37 | (2) | | |
| 10 | 17.91 | 0.05 | 1.551 | 45.8 |
| 11 | 0.63 | (3) | | |
| 12 | 3.63 | 0.22 | 1.697 | 55.5 |
| 13 | −1.73 | 0.02 | | |
| 14 | −1.46 | 0.09 | 1.785 | 25.7 |
| 15 | −2.70 | | | |

| EFL | ZOOM SPACE (1) | ZOOM SPACE (2) | ZOOM SPACE (3) |
|---|---|---|---|
| 1.0 | 3.49 | 0.10 | 1.28 |
| 1.74 | 2.27 | 0.09 | 2.51 |
| 2.78 | 1.31 | 0.15 | 3.42 |

$|F_A/FVD| = 0.33 \quad F_A = -2.23$
$F_B/FVD = 0.14 \quad F_B = 0.95$
$|F_C/FVD| = 0.18 \quad F_C = -1.18$
$F_D/FVD = 0.43 \quad F_D = 2.88$
$F_D/BFL = 3.16$

TABLE VI

Dimensions Are Given in Ratios of Unity Focal Length

| EFL | BFL | F/N | FVD |
|---|---|---|---|
| 1.0−2.78 | 0.91 | 5.6 | 6.78 |

Iris is located at 0.04mm in front of surface 10.

| Surface No. | Radius | Thickness | $N_D$ | V |
|---|---|---|---|---|
| 1 | 69.54 | 0.16 | 1.785 | 25.7 |
| 2 | −4.04 | 0.01 | | |
| 3 | −5.56 | 0.09 | 1.673 | 56.5 |
| 4 | 1.28 | (1) | | |
| 5 | 1.88 | 0.23 | 1.697 | 55.5 |
| 6 | −8.06 | 0.01 | | |
| 7 | 0.98 | 0.19 | 1.697 | 55.5 |
| 8 | −2.75 | 0.05 | 1.785 | 25.7 |
| 9 | 8.89 | (2) | | |
| 10 | 14.46 | 0.05 | 1.558 | 44.3 |
| 11 | 0.61 | (3) | | |
| 12 | 3.13 | 0.26 | 1.603 | 60.7 |
| 13 | −1.66 | 0.02 | | |
| 14 | −1.42 | 0.09 | 1.785 | 25.7 |
| 15 | −2.16 | | | |

| EFL | ZOOM SPACE (1) | ZOOM SPACE (2) | ZOOM SPACE (3) |
|---|---|---|---|
| 1.0 | 3.50 | 0.10 | 1.11 |
| 1.74 | 2.20 | 0.09 | 2.34 |
| 2.78 | 1.31 | 0.15 | 3.25 |

$|F_A/FVD| = 0.34 \quad F_A = -2.28$
$F_B/FVD = 0.14 \quad F_B = 0.97$
$|F_C/FVD| = 0.17 \quad F_C = -1.13$
$F_D/FVD = 0.41 \quad F_D = 2.76$
$F_D/BFL = 3.03$

TABLE VII

Dimensions Are Given in Ratios of Unity Focal Length

| EFL | BFL | F/N | FVD |
|---|---|---|---|
| 1.0−3.0 | 0.59 | 4.0 | 5.91 |

Iris is located at 0.05 in front of surface 9.

| Surface No. | Radius | Thickness | $N_D$ | V |
|---|---|---|---|---|
| 1 | 7.53 | 0.13 | 1.806 | 39.1 |
| 2 | −4.26 | 0.005 | | |
| 3 | −4.57 | 0.09 | 1.697 | 55.5 |
| 4 | 1.22 | (1) | | |
| 5 | 1.26 | 0.24 | 1.710 | 52.9 |
| 6 | −4.37 | 0.005 | | |
| 7 | 0.74 | 0.20 | 1.708 | 53.2 |
| 8 | 2.28 | (2) | | |
| 9 | −68.34 | 0.05 | 1.805 | 26.5 |
| 10 | 0.51 | (3) | | |
| 11 | 1.49 | 0.16 | 1.603 | 60.7 |
| 12 | −8.30 | | | |

| EFL | ZOOM SPACE (1) | ZOOM SPACE (2) | ZOOM SPACE (3) |
|---|---|---|---|
| 1.0 | 3.30 | 0.13 | 1.00 |
| 1.82 | 2.20 | 0.12 | 2.11 |
| 3.0 | 1.25 | 0.14 | 3.04 |

$|F_A/FVD| = 0.40 \quad F_A = -2.37$
$F_B/FVD = 0.12 \quad F_B = 0.73$
$|F_C/FVD| = 0.13 \quad F_C = -0.76$
$F_D/FVD = 0.36 \quad F_D = 2.10$
$F_D/BFL = 3.56$

TABLE VIII

Dimensions Are Given in Ratios of Unity Focal Length

| EFL | BFL | F/N | FVD |
|---|---|---|---|
| 1.0−3.0 | 0.68 | 4.0 | 5.91 |

Iris is located at 0.05 in front of surface 9.

| Surface No. | Radius | Thickness | $N_D$ | V |
|---|---|---|---|---|
| 1 | 11.71 | 0.13 | 1.805 | 26.8 |
| 2 | −7.46 | 0.005 | | |
| 3 | −25.14 | 0.09 | 1.697 | 55.5 |
| 4 | 1.22 | (1) | | |
| 5 | 1.37 | 0.21 | 1.713 | 52.2 |
| 6 | −4.26 | 0.005 | | |
| 7 | 0.80 | 0.19 | 1.697 | 55.5 |
| 8 | 3.18 | (2) | | |
| 9 | −23.07 | 0.15 | 1.805 | 26.5 |
| 10 | 0.53 | (3) | | |
| 11 | 1.44 | 0.23 | 1.603 | 60.7 |
| 12 | −7.75 | | | |

| EFL | ZOOM SPACE (1) | ZOOM SPACE (2) | ZOOM SPACE (3) |
|---|---|---|---|
| 1.0 | 3.23 | 0.12 | 0.87 |
| 1.82 | 2.10 | 0.11 | 2.01 |
| 3.0 | 1.14 | 0.14 | 2.93 |

$|F_A/FVD| = 0.40 \quad F_A = -2.39$
$F_B/FVD = 0.13 \quad F_B = 0.75$
$|F_C/FVD| = 0.11 \quad F_C = -0.63$
$F_D/FVD = 0.34 \quad F_D = 2.02$

TABLE VIII-continued $F_D/BFL = 2.97$

TABLE IX

Dimensions Are Given in Ratios of Unity Focal Length

| EFL | BFL | F/N | FVD |
|---|---|---|---|
| 1.0-3.0 | 0.68 | 4.0 | 5.91 |

Iris is located at 0.05mm in front of surface 9.

| Surface No. | Radius | Thickness | $N_D$ | V |
|---|---|---|---|---|
| 1 | 54.17 | 0.13 | 1.805 | 31.6 |
| 2 | −5.77 | 0.005 | | |
| 3 | −26.81 | 0.09 | 1.656 | 57.4 |
| 4 | 1.19 | (1) | | |
| 5 | 1.35 | 0.22 | 1.713 | 52.2 |
| 6 | −4.17 | 0.005 | | |
| 7 | 0.77 | 0.19 | 1.697 | 55.5 |
| 8 | 2.36 | (2) | | |
| 9 | 46.38 | 0.16 | 1.805 | 26.5 |
| 10 | 0.50 | (3) | | |
| 11 | 1.05 | 0.05 | 1.806 | 40.7 |
| 12 | 0.87 | 0.005 | | |
| 13 | 0.88 | 0.17 | 1.493 | 66.2 |
| 14 | −5.02 | | | |

| EFL | ZOOM SPACE (1) | ZOOM SPACE (2) | ZOOM SPACE (3) |
|---|---|---|---|
| 1.0 | 3.24 | 0.12 | 0.85 |
| 1.82 | 2.10 | 0.12 | 1.99 |
| 3.0 | 1.14 | 0.15 | 2.92 |

$|F_A/FVD| = 0.40 \quad F_A = -2.39$
$F_B/FVD = 0.13 \quad F_B = 0.76$
$|F_C/FVD| = 0.11 \quad F_C = -0.63$
$F_D/FVD = 0.33 \quad F_D = 1.97$
$F_D/BFL = 2.90$ Rear Relay Group In The Viewing Path

| Surface No. | Radius | Thickness | $N_D$ | V |
|---|---|---|---|---|
| 1 | 1.96 | 0.52(*) | 1.658 | 50.9 |
| 2 | −0.69 | 0.23 | 1.755 | 27.5 |
| 3 | −1.87 | 0.09 | | |

BFL = 0.78
(*)This is the distance from the second folding means.

Viewfinder Group

| Surface No. | Radius | Thickness | $N_D$ | V |
|---|---|---|---|---|
| 1(**) | Plano | 0.04 | | |
| 2 | Plano | 0.12 | 1.517 | 64.2 |
| 3 | −1.03 | 1.9 | | |
| 4 | 1.55 | 0.13 | 1.517 | 64.2 |
| 5 | −1.14 | 0.07 | 1.805 | 25.5 |
| 6 | −2.13 | | | |

Eye Relief = 0.52
Field of View = 16.2°
(**)Surface 1 is the focusing screen.

While preferred embodiments of the present invention have been described and illustrated, it is apparent alterations, additions, and omissions may be made without departing from the scope of the invention.

I claim:

1. An optical system of compact configuration along which reflector means may be introduced for deflecting the optical path of said optical system, and having substantially the following specification:

Dimensions Are Given in Ratios of Unity Focal Length

| EFL | BFL | F/N | FVD |
|---|---|---|---|
| 1.0-2.78 | 0.91 | 5.6 | 7.33 |

Iris is located at 0.03 in front of surface 10.

| Surface No. | Radius | Thickness | $N_D$ | V |
|---|---|---|---|---|
| 1 | −41.35 | 0.12 | 1.785 | 25.7 |
| 2 | −4.17 | 0.01 | | |
| 3 | −5.88 | 0.09 | 1.658 | 57.3 |
| 4 | 1.47 | (1) | | |
| 5 | 2.09 | 0.11 | 1.697 | 55.5 |
| 6 | Plano | 0.01 | | |
| 7 | 1.24 | 0.16 | 1.697 | 55.5 |
| 8 | −4.08 | 0.05 | 1.785 | 25.7 |
| 9 | 4.08 | (2) | | |
| 10 | 1.56 | 0.05 | 1.518 | 59.0 |
| 11 | 0.71 | (3) | | |
| 12 | 3.32 | 0.22 | 1.697 | 55.5 |
| 13 | −1.64 | 0.06 | | |
| 14 | −1.43 | 0.09 | 1.785 | 25.7 |
| 15 | −3.65 | | | |

| EFL | ZOOM SPACE (1) | ZOOM SPACE (2) | ZOOM SPACE (3) |
|---|---|---|---|
| 1.0 | 4.01 | 0.19 | 1.25 |
| 1.74 | 2.62 | 0.09 | 2.74 |
| 2.78 | 1.54 | 0.19 | 3.72 |

$|F_A/FVD| = 0.35 \quad F_A = -2.57$
$F_B/FVD = 0.20 \quad F_B = 1.43$
$|F_C/FVD| = 0.35 \quad F_C = 2.58$
$F_D/FVD = 0.44 \quad F_D = 3.25$
$F_D/BFL = 3.57$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

2. An optical system of compact configuration along which reflector means may be introduced for deflecting the optical path of said optical system, and having substantially the following specification:

Dimensions Are Given in Ratios of Unity Focal Length

| EFL | BFL | F/N | FVD |
|---|---|---|---|
| 1.0-2.0 | 0.61 | 4.0 | 4.64 |

Iris is located at 0.02 in front of surface 9.

| Surface No. | Radius | Thickness | $N_D$ | V |
|---|---|---|---|---|
| 1 | 3.93 | 0.10 | 1.673 | 32.2 |
| 2 | −4.69 | 0.004 | | |
| 3 | −7.19 | 0.07 | 1.620 | 60.3 |
| 4 | 0.89 | (1) | | |
| 5 | 0.92 | 0.16 | 1.639 | 55.5 |
| 6 | −19.68 | 0.08 | | |
| 7 | 1.22 | 0.13 | 1.630 | 58.3 |
| 8 | −19.14 | (2) | | |
| 9 | −1.62 | 0.04 | 1.673 | 32.2 |
| 10 | 0.39 | 0.01 | | |
| 11 | 0.43 | 0.08 | 1.658 | 57.3 |
| 12 | 1.18 | (3) | | |
| 13 | 23.63 | 0.04 | 1.689 | 31.2 |
| 14 | −6.81 | 0.004 | | |
| 15 | 0.92 | 0.09 | 1.713 | 53.9 |
| 16 | 3.03 | | | |

| EFL | ZOOM SPACE (1) | ZOOM SPACE (2) | ZOOM SPACE (3) |
|---|---|---|---|
| 1.0 | 2.12 | 0.19 | 0.91 |
| 1.5 | 1.45 | 0.20 | 1.57 |
| 2.0 | 0.99 | 0.23 | 2.01 |

$|F_A/FVD| = 0.47 \quad F_A = -2.20$
$F_B/FVD = 0.18 \quad F_B = 0.83$
$|F_C/FVD| = 0.18 \quad F_C = 0.85$
$F_D/FVD = 0.31 \quad F_D = 1.46$
$F_D/BFL = 2.39$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

3. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0–2.78 | 0.91 | 5.6 | 7.33 |
| Iris is located at 0.03 in front of surface 10. | | | |

| Surface No. | Radius | Thickness | $N_D$ | V |
|---|---|---|---|---|
| 1 | −39.54 | 0.12 | 1.785 | 25.7 |
| 2 | −4.15 | 0.01 | | |
| 3 | −5.79 | 0.09 | 1.658 | 57.3 |
| 4 | 1.48 | (1) | | |
| 5 | 2.12 | 0.11 | 1.697 | 55.5 |
| 6 | −146.90 | 0.01 | | |
| 7 | 1.24 | 0.16 | 1.697 | 55.5 |
| 8 | −4.00 | 0.05 | 1.785 | 25.7 |
| 9 | 4.20 | (2) | | |
| 10 | 1.59 | 0.05 | 1.518 | 59.0 |
| 11 | 0.72 | (3) | | |
| 12 | 3.44 | 0.22 | 1.697 | 55.5 |
| 13 | −1.62 | 0.06 | | |
| 14 | −1.40 | 0.09 | 1.785 | 25.7 |
| 15 | −3.45 | | | |

| EFL | ZOOM SPACE (1) | ZOOM SPACE (2) | ZOOM SPACE (3) |
|---|---|---|---|
| 1.0 | 4.02 | 0.19 | 1.25 |
| 1.74 | 2.63 | 0.09 | 2.74 |
| 2.78 | 1.54 | 0.19 | 3.72 |
| $|F_A/FVD|$ = 0.35 | | $F_A$ = −2.57 | |
| $F_B/FVD$ = 0.20 | | $F_B$ = 1.43 | |
| $|F_C/FVD|$ = 0.35 | | $F_C$ = 2.58 | |
| $F_D/FVD$ = 0.44 | | $F_D$ = 3.25 | |
| $F_D/BFL$ = 3.57 | | | | wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

4. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0–2.78 | 0.91 | 5.6 | 7.13 |
| Iris is located at 0.04 in front of surface 10. | | | |

| Surface No. | Radius | Thickness | $N_D$ | V |
|---|---|---|---|---|
| 1 | −41.01 | 0.12 | 1.785 | 25.7 |
| 2 | −3.98 | 0.01 | | |
| 3 | −5.40 | 0.09 | 1.654 | 57.5 |
| 4 | 1.43 | (1) | | |
| 5 | 2.24 | 0.11 | 1.697 | 55.5 |
| 6 | −16.57 | 0.01 | | |
| 7 | 1.08 | 0.16 | 1.697 | 55.5 |
| 8 | −3.67 | 0.05 | 1.785 | 25.7 |
| 9 | 3.98 | (2) | | |
| 10 | 2.03 | 0.05 | 1.511 | 57.8 |
| 11 | 0.67 | (3) | | |
| 12 | 3.67 | 0.22 | 1.697 | 55.5 |
| 13 | −1.59 | 0.06 | | |
| 14 | −1.38 | 0.09 | 1.785 | 25.7 |
| 15 | −3.11 | | | |

| EFL | ZOOM SPACE (1) | ZOOM SPACE (2) | ZOOM SPACE (3) |
|---|---|---|---|
| 1.0 | 3.87 | 0.15 | 1.25 |
| 1.74 | 2.53 | 0.09 | 2.65 |
| 2.78 | 1.48 | 0.17 | 3.62 |
| $|F_A/FVD|$ = 0.35 | | $F_A$ = −2.50 | |
| $F_B/FVD$ = 0.18 | | $F_B$ = 1.26 | |
| $|F_C/FVD|$ = 0.28 | | $F_C$ = −1.97 | |
| $F_D/FVD$ = 0.44 | | $F_D$ = 3.14 | |
| $F_D/BFL$ = 3.45 | | | | wherein the first column lists the surfaces of lens elements numerically starting at the ray entrance side of the system; the second column lists the respective base radii; the third column lists the thickness of the respective elements and the spacing therebetween; the fourth and fifth columns respectively list the index of refraction $N_D$ and the dispersive index V of the optical materials of the respective elements.

5. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0–2.78 | 0.91 | 5.6 | 6.71 |
| Iris is located at 0.04 in front of surface 10. | | | |

| Surface No. | Radius | Thickness | $N_D$ | V |
|---|---|---|---|---|
| 1 | 38.20 | 0.12 | 1.785 | 25.7 |
| 2 | −3.95 | 0.01 | | |
| 3 | −5.32 | 0.09 | 1.673 | 56.5 |
| 4 | 1.23 | (1) | | |
| 5 | 1.80 | 0.11 | 1.697 | 55.5 |
| 6 | −8.20 | 0.01 | | |
| 7 | 1.02 | 0.16 | 1.697 | 55.5 |
| 8 | −2.65 | 0.05 | 1.785 | 25.7 |
| 9 | 11.37 | (2) | | |
| 10 | 17.91 | 0.05 | 1.551 | 45.8 |
| 11 | 0.63 | (3) | | |
| 12 | 3.63 | 0.22 | 1.697 | 55.5 |
| 13 | −1.73 | 0.02 | | |
| 14 | −1.46 | 0.09 | 1.785 | 25.7 |
| 15 | −2.70 | | | |

| EFL | ZOOM SPACE (1) | ZOOM SPACE (2) | ZOOM SPACE (3) |
|---|---|---|---|
| 1.0 | 3.49 | 0.10 | 1.28 |
| 1.74 | 2.27 | 0.09 | 2.51 |
| 2.78 | 1.31 | 0.15 | 3.42 |
| $|F_A/FVD|$ = 0.33 | | $F_A$ = −2.23 | |
| $F_B/FVD$ = 0.14 | | $F_B$ = 0.95 | |
| $|F_C/FVD|$ = 0.18 | | $F_C$ = −1.18 | |
| $F_D/FVD$ = 0.43 | | $F_D$ = 2.88 | |
| $F_D/BFL$ = 3.16 | | | | wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

6. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0-2.78 | 0.91 | 5.6 | 6.78 |
| Iris is located at 0.04 in front of surface 10. | | | |

| Surface No. | Radius | Thickness | $N_D$ | V |
|---|---|---|---|---|
| 1 | 69.54 | 0.16 | 1.785 | 25.7 |
| 2 | −4.04 | 0.01 | | |
| 3 | −5.56 | 0.09 | 1.673 | 56.5 |
| 4 | 1.28 | (1) | | |
| 5 | 1.88 | 0.23 | 1.697 | 55.5 |
| 6 | −8.06 | 0.01 | | |
| 7 | 0.98 | 0.19 | 1.697 | 55.5 |
| 8 | −2.75 | 0.05 | 1.785 | 25.7 |
| 9 | 8.89 | (2) | | |
| 10 | 14.46 | 0.05 | 1.558 | 44.3 |
| 11 | 0.61 | (3) | | |
| 12 | 3.13 | 0.26 | 1.603 | 60.7 |
| 13 | −1.66 | 0.02 | | |
| 14 | −1.42 | 0.09 | 1.785 | 25.7 |
| 15 | −2.16 | | | |

| EFL | ZOOM SPACE (1) | ZOOM SPACE (2) | ZOOM SPACE (3) |
|---|---|---|---|
| 1.0 | 3.50 | 0.10 | 1.11 |
| 1.74 | 2.20 | 0.09 | 2.34 |
| 2.78 | 1.31 | 0.15 | 3.25 |

$|F_A/FVD| = 0.34 \quad F_A = -2.28$
$F_B/FVD = 0.14 \quad F_B = 0.97$
$|F_C/FVD| = 0.17 \quad F_C = -1.13$
$F_D/FVD = 0.41 \quad F_D = 2.76$
$F_D/BFL = 3.03$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

7. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0-3.0 | 0.59 | 4.0 | 5.91 |
| Iris is located at 0.05 in front of surface 9. | | | |

| Surface No. | Radius | Thickness | $N_D$ | V |
|---|---|---|---|---|
| 1 | 7.53 | 0.13 | 1.806 | 39.1 |
| 2 | −4.26 | 0.005 | | |
| 3 | −4.57 | 0.09 | 1.697 | 55.5 |
| 4 | 1.22 | (1) | | |
| 5 | 1.26 | 0.24 | 1.710 | 52.9 |
| 6 | −4.37 | 0.005 | | |
| 7 | 0.74 | 0.20 | 1.708 | 53.2 |
| 8 | 2.28 | (2) | | |
| 9 | −68.34 | 0.05 | 1.805 | 26.5 |
| 10 | 0.51 | (3) | | |
| 11 | 1.49 | 0.16 | 1.603 | 60.7 |
| 12 | −8.30 | | | |

| EFL | ZOOM SPACE (1) | ZOOM SPACE (2) | ZOOM SPACE (3) |
|---|---|---|---|
| 1.0 | 3.30 | 0.13 | 1.00 |
| 1.82 | 2.20 | 0.12 | 2.11 |
| 3.0 | 1.25 | 0.14 | 3.04 |

-continued $|F_A/FVD| = 0.40 \quad F_A = -2.37$
$F_B/FVD = 0.12 \quad F_B = 0.73$
$|F_C/FVD| = 0.13 \quad F_C = -0.76$
$F_D/FVD = 0.36 \quad F_D = 2.10$
$F_D/BFL = 3.56$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

8. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0-3.0 | 0.68 | 4.0 | 5.91 |
| Iris is located at 0.05 in front of surface 9. | | | |

| Surface No. | Radius | Thickness | $N_D$ | V |
|---|---|---|---|---|
| 1 | 11.71 | 0.13 | 1.805 | 26.8 |
| 2 | −7.46 | 0.005 | | |
| 3 | −25.14 | 0.09 | 1.697 | 55.5 |
| 4 | 1.22 | (1) | | |
| 5 | 1.37 | 0.21 | 1.713 | 52.2 |
| 6 | −4.26 | 0.005 | | |
| 7 | 0.80 | 0.19 | 1.697 | 55.5 |
| 8 | 3.18 | (2) | | |
| 9 | −23.07 | 0.15 | 1.805 | 26.5 |
| 10 | 0.53 | (3) | | |
| 11 | 1.44 | 0.23 | 1.603 | 60.7 |
| 12 | −7.75 | | | |

| EFL | ZOOM SPACE (1) | ZOOM SPACE (2) | ZOOM SPACE (3) |
|---|---|---|---|
| 1.0 | 3.23 | 0.12 | 0.87 |
| 1.82 | 2.10 | 0.11 | 2.01 |
| 3.0 | 1.14 | 0.14 | 2.93 |

$|F_A/FVD| = 0.40 \quad F_A = -2.39$
$F_B/FVD = 0.13 \quad F_B = 0.75$
$|F_C/FVD| = 0.11 \quad F_C = -0.63$
$F_D/FVD = 0.34 \quad F_D = 2.02$
$F_D/BFL = 2.97$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

9. An optical system of compact configuration along which reflector means may be introduced for deflecting the optical path of said optical system, and having substantially the following specification:

| Dimensions Are Given in Ratios of Unity Focal Length | | | |
|---|---|---|---|
| EFL | BFL | F/N | FVD |
| 1.0-3.0 | 0.68 | 4.0 | 5.91 |
| Iris is located at 0.05 in front of surface 9. | | | |

| Surface No. | Radius | Thickness | $N_D$ | V |
|---|---|---|---|---|
| 1 | 54.17 | 0.13 | 1.805 | 31.6 |
| 2 | −5.77 | 0.005 | | |

-continued

| | | | | |
|---|---|---|---|---|
| 3 | −26.81 | 0.09 | 1.656 | 57.4 |
| 4 | 1.19 | (1) | | |
| 5 | 1.35 | 0.22 | 1.713 | 52.2 |
| 6 | −4.17 | 0.005 | | |
| 7 | 0.77 | 0.19 | 1.697 | 55.5 |
| 8 | 2.36 | (2) | | |
| 9 | 46.38 | 0.16 | 1.805 | 26.5 |
| 10 | 0.50 | (3) | | |
| 11 | 1.05 | 0.05 | 1.806 | 40.7 |
| 12 | 0.87 | 0.005 | | |
| 13 | 0.88 | 0.17 | 1.493 | 66.2 |
| 14 | −5.02 | | | |

| EFL | ZOOM SPACE | ZOOM SPACE | ZOOM SPACE |
|---|---|---|---|
| | (1) | (2) | (3) |
| 1.0 | 3.24 | 0.12 | 0.85 |
| 1.82 | 2.10 | 0.12 | 1.99 |
| 3.0 | 1.14 | 0.15 | 2.92 |

$|F_A/FVD| = 0.40 \quad F_A = -2.39$
$F_B/FVD = 0.13 \quad F_B = 0.76$
$|F_C/FVD| = 0.11 \quad F_C = -0.63$
$F_D/FVD = 0.33 \quad F_D = 1.97$
$F_D/BFL = 2.90$ wherein the first column lists the surfaces of lens elements numerically starting at the ray entrance side of the system; the second column lists the respective base radii; the third column lists the thicknesses of the respective elements and the spacing therebetween; the fourth and fifth columns respectively list the index of refraction $N_D$ and the dispersive index V of the optical materials of the respective elements.

10. An optical system for a camera having a substantially rectangular housing substantially enclosing a zoom lens defining an optical axis with a light ray entrance through one side of the housing to form an image at a film plane in the housing, said plane arranged perpendicular to a portion of the optical axis;

the zoom lens comprising four lens groups, a first negative group being axially movable to focus the lens, a second positive lens group and a third negative lens group, said second and third groups being axially movable to vary the equivalent focal length of the lens, and a fourth positive lens group;

means twice folding the optical axis of said lens between said first and second lens groups and between said third and fourth lens groups;

an aperture defining means located between second and third lens groups; and a shutter means located in front of the film plane;
said lens satisfying the following relationships:

$0.3 \leq |F_A/FVD| \leq 0.5$
$0.1 \leq F_B/FVD \leq 0.2$
$0.1 \leq |F_C/FVD| \leq 0.4$
$0.3 \leq F_D/FVD \leq 0.5$
$F_A < 0$
$F_D/BFL \geq 2.4$ where $F_A$, $F_B$, $F_C$ and $F_D$ are equivalent focal lengths of the four groups from the object to the image end, respectively; FVD is the front vertex distance of the lens, and BFL is the back focal length of the lens.

11. An improvement in an optical system for a camera as in claim 10 further comprising:

a viewfinder system having an axis formed as an extension of the optical axis of said zoom lens beyond one of said means folding the optical axis;

wherein said viewfinder system receives light rays from said lens by a relay lens group and comprises:

a focusing screen in the optical path formed by said relay group;

a field lens between the screen and an eyepiece; and mirror means arranged to achieve the proper orientation of the image as it is seen through the eyepiece by thrice folding the optical path between the field lens and the eyepiece.

12. The lens of claim 10 wherein said first group comprises a positive meniscus concave to the object and a biconcave element.

13. The lens of claim 12 wherein said second group comprises a biconvex elements and a positive doublet, said third group comprises a meniscus convex to the object and said fourth group comprises a biconvex element and a meniscus concave to the object.

14. An optical system for a camera having a substantially rectangular housing substantially enclosing a zoom lens defining an optical axis with a light ray entrance through one side of the housing to form an image at a film plane in the housing, said plane arranged perpendicular to a portion of the optical axis;

the zoom lens comprising four lens groups, a first negative group being axially movable to focus the lens, a second positive lens group and a third negative lens group, said second and third groups being axially movable to vary the equivalent focal length of the lens, and a fourth positive lens group; said first group comprising a positive meniscus concave to the object and a biconcave element; said second group comprising a biconvex element and a positive doublet, said third group comprising a meniscus convex to the object; and said fourth group comprising a biconvex element and a meniscus concave to the object;

means twice folding the optical axis of said lens between said first and second lens groups and between said third and fourth lens groups;

an aperture defining means located between said second and third lens groups; and a shutter means located in front of the film plane.

* * * * *